United States Patent
Lee et al.

(10) Patent No.: US 7,825,934 B2
(45) Date of Patent: Nov. 2, 2010

(54) SYSTEM, MEDIUM, AND METHOD AUTOMATICALLY CREATING A DYNAMIC IMAGE OBJECT

(75) Inventors: Hye-Jeong Lee, Seoul (KR); Ji-hye Chung, Seoul (KR); Yeun-bae Kim, Seongnam-si (KR); Min-kyu Park, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 735 days.

(21) Appl. No.: 11/583,776

(22) Filed: Oct. 20, 2006

(65) Prior Publication Data

US 2007/0101251 A1    May 3, 2007

(30) Foreign Application Priority Data

Nov. 2, 2005   (KR) .................. 10-2005-0104435

(51) Int. Cl.
G09G 5/00 (2006.01)
G06K 9/46 (2006.01)
G06K 9/40 (2006.01)
G06K 9/32 (2006.01)
G06F 17/00 (2006.01)

(52) U.S. Cl. ............... 345/581; 345/619; 345/606; 345/643; 382/207; 382/254; 382/300; 715/205; 715/210; 715/233; 715/234

(58) Field of Classification Search ............ 715/200, 715/205, 210, 233–234, 253, 700, 764, 825; 345/619–620, 606, 581, 594, 643, 548, 650; 382/164, 209, 207, 254, 282, 300–305

See application file for complete search history.

(56) References Cited

U.S. PATENT DOCUMENTS

| 6,222,947 | B1 | 4/2001 | Koba | |
| 6,253,367 | B1* | 6/2001 | Tran et al. | 717/108 |
| 2002/0059327 | A1* | 5/2002 | Starkey | 707/203 |
| 2003/0009563 | A1* | 1/2003 | Douglis et al. | 709/227 |
| 2003/0163784 | A1* | 8/2003 | Daniel et al. | 715/514 |
| 2003/0187950 | A1* | 10/2003 | Rising, III | 709/218 |

(Continued)

FOREIGN PATENT DOCUMENTS

JP    08-249385    9/1996

(Continued)

OTHER PUBLICATIONS

Japanese Office Action, dated Mar. 17, 2009, issued in corresponding Japanese Patent Application No. 2006-298339.

(Continued)

*Primary Examiner*—Wesner Sajous
(74) *Attorney, Agent, or Firm*—Staas & Halsey LLP (57) ABSTRACT

A system, medium, and method to automatically create a dynamic image object, which can create content in image unit groups of dynamic image objects. The system may include a template selection module that selects a template from an image unit group corresponding to a desired content group that includes content, a content-arrangement module that arranges the content in the selected template, and a dynamic image object supply module that supplies a dynamic image object in which the content is arranged.

20 Claims, 6 Drawing Sheets

U.S. PATENT DOCUMENTS

| | | | |
|---|---|---|---|
| 2003/0195802 A1* | 10/2003 | Hensen et al. | 705/14 |
| 2005/0231746 A1* | 10/2005 | Parry et al. | 358/1.13 |
| 2005/0235201 A1* | 10/2005 | Brown et al. | 715/517 |
| 2005/0271257 A1* | 12/2005 | Suzuki et al. | 382/118 |
| 2006/0101122 A1* | 5/2006 | Ishii | 709/206 |
| 2006/0150088 A1* | 7/2006 | Kraft et al. | 715/517 |
| 2007/0033280 A1* | 2/2007 | Popp et al. | 709/224 |
| 2007/0168060 A1* | 7/2007 | Nixon et al. | 700/83 |
| 2007/0299853 A1* | 12/2007 | Knotz et al. | 707/10 |
| 2009/0222489 A1* | 9/2009 | Sudoh et al. | 707/104.1 |

FOREIGN PATENT DOCUMENTS

| | | |
|---|---|---|
| JP | 10-293856 | 11/1998 |
| JP | 2000-067256 | 3/2000 |
| JP | 2002-049907 | 2/2002 |
| JP | 2002-288669 | 10/2002 |
| JP | 2004-118352 | 4/2004 |
| KR | 2001-0110178 | 12/2001 |
| KR | 10-2004-0106990 | 12/2004 |
| KR | 10-2005-0022777 | 3/2005 |
| KR | 10-2005-0003690 | 12/2005 |

OTHER PUBLICATIONS

Japanese Office Action dated Aug. 25, 2009, issued in corresponding Japanese patent application. No. 2006-298339.

Japanese Office Action dated Jan. 26, 2010 corresponding to Japanese Patent Application No. 2006-298339.

* cited by examiner

SYSTEM, MEDIUM, AND METHOD AUTOMATICALLY CREATING A DYNAMIC IMAGE OBJECT

CROSS-REFERENCE TO RELATED APPLICATIONS

This application is based on and claims priority from Korean Patent Application No. 10-2005-0104435, filed on Nov. 2, 2005, in the Korean Intellectual Property Office, the disclosure of which is incorporated herein in its entirety by reference.

BACKGROUND OF THE INVENTION

1. Field of the Invention

An embodiment of the present invention relates to a system, medium, and method to automatically create a dynamic image object, and more particularly to a system, medium, and method to automatically create a dynamic image object that can create an image object including image unit groups to express content.

2. Description of the Related Art

Generally, slideshows are mainly used to display multiple contents at predetermined time intervals in order for a user to appreciate the displayed content, such as pictures.

Such slideshows simply display desired content, and after a predetermined time has lapsed, more content is displayed. Since such slideshows display the content for a desired time, that displayed content is statically expressed, with the user being prevented from constructing the content according to his or her preferences. Thus, the current slideshows cannot satisfy the user's desires, such as when the user intends to make the content include images and intends to dynamically express the images.

Further, since conventional slideshows display the content sequentially, the user cannot instinctively recognize the relevancy of the currently-displayed content, content that has already been displayed, or content that will be displayed. Further, since slideshows statically display images, the slideshows are at a disadvantage in that the images cannot be variously expressed. In other words, since slideshows statically display desired images for a short time, it is difficult for the user to instinctively grasp the relevancy of the various content; for example, the relevancy of content such as pictures that were taken at the same location.

Thus, in order to eliminate the monotony of conventional slideshows, additional effects such as a sticker and a caption, and various appreciatory effects such as pan and tilt have been recently implemented. However, there is still a sense of monotony to the content, and the style of corresponding personal content remains unchanged.

Here, Korean Laid-open Patent Publication No. 2001-110178, for example, discusses a multimedia system for synchronizing music tracks with image tracks, in which a synchronized information recording device records each sequence track synchronization information along with a plurality of sequence tracks having various information recorded therein, integrates sequence track synchronization information with an identical file to form a multimedia file so as to accurately control the synchronized information in each sequence track. In this multimedia system for synchronizing the music tracks with the image tracks, however, it is inconvenient to re-measure the time required for the synchronization of the content with the music using simple synchronization according to time reference, and to change the number of sets of content along with the length of the music.

Accordingly, as discussed below, embodiments of the present invention have been made to solve these above-mentioned problems and drawbacks.

SUMMARY OF THE INVENTION

An aspect of an embodiment of the present invention is to provide a system, medium, and method to automatically create a dynamic image object that can form image groups through templates capable of providing various expressions to content according to the relevancy of various content, thereby providing the content having a dynamic image object.

Additional aspects and/or advantages of the invention will be set forth in part in the description which follows and, in part, will be apparent from the description, or may be learned by practice of the invention.

To achieve the above and/or other aspects and advantages, embodiments of the present invention include a system to automatically create a dynamic image object, including a template selection module to select a template from an image unit group corresponding to a desired content group that includes content, a content-arrangement module to arrange a selected content in the selected template, and a dynamic image object supply module to supply a dynamic image object in which the content is arranged.

The template selection module may select the template corresponding to the content group based on at least one selection condition among a plurality of selection conditions including a number of contents, a respective content subject, a respective content color, a respective content time of obtainment, a respective content place of obtainment, a respective template frequency of use, and user preferences.

In addition, the template selection module may select a template having a greatest score based on a calculated value for each of the selection conditions and a weight assigned to each of the selection conditions.

Here, a score S may be obtained based on: $S=\Sigma(W(i)*S(i))$, where $S(i)$ is a calculated value for each selection condition, and $W(i)$ is a weight assigned to each selection condition.

The template selection module may select one structural element from structural elements of the template in consideration of at least one of the user preferences and a quality of appeal with respect to the content.

The system may further include a template conversion module to convert the selected template according to the content, and a content conversion module to convert the content according to the selected template.

The template conversion module may convert the selected template when a number of contents included in the content group is greater than a number of contents to be arranged in the selected template.

Further, the content-arrangement module may arrange the content in the converted template.

The content conversion module may further convert attributes of the content including a color attribute of the content, an image conversion and a displayed region/interval according to context information including an atmosphere of the selected template, a color attribute, and a timed background.

In addition, the template and the dynamic moving image may be expressed in a markup language.

Still further, the system may include a storage module to store the dynamic moving image in which the content is arranged, and a display module to display the dynamic image object in which the content is arranged.

Here, the display module may synchronize the dynamic image object with background music, so as to display the dynamic image object.

To achieve the above and/or other aspects and advantages, embodiments of the present invention include a method of automatically creating a dynamic image object, including selecting a template from an image unit group corresponding to a desired content group including contents, arranging the selected content in the selected template, and supplying the dynamic image object in which the content is arranged.

The template selection may include selecting the template corresponding to the content group based on at least one selection condition among a plurality of selection conditions including a number of the contents, a respective content subject, a respective content color, a respective content time of obtainment, a respective content place of obtainment, a respective template frequency of use, and user preferences.

Further, the template selection may include selecting a template having a greatest score based on a calculated value for each of the selection conditions and a weight assigned to each of the selection conditions.

Here, a score S may be obtained based on: $S=\Sigma(W(i)*S(i))$, where $S(i)$ is a calculated value for each selection condition, and $W(i)$ is a weight assigned to each selection condition.

In addition, the template selection may include selecting one structural element from structural elements of the template in consideration of at least one of the user preferences and a quality of appeal with respect to the content.

The method may further include converting the selected template according to the content, and converting the content according to the selected template.

Further, the template conversion may include converting the selected template when a number of the contents included in the content group is greater than a number of contents to be arranged in the selected template.

Still further, in the content arrangement, the content may be arranged in the converted template.

The content conversion may include converting attributes of the content including a color attribute of the content, an image conversion and a displayed region/interval according to context information including an atmosphere of the selected template, a color attribute, and timed background.

In addition, the template and the dynamic image object may be expressed in a markup language.

The method may further include storing the dynamic image object in which the content is arranged, and displaying the dynamic image object in which the content is arranged.

Here, the dynamic image object displaying may include synchronizing the dynamic image object with background music, so as to display the dynamic image object.

To achieve the above and/or other aspects and advantages, embodiments of the present invention include at least one medium including computer readable code to control at least one processing element to implement embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
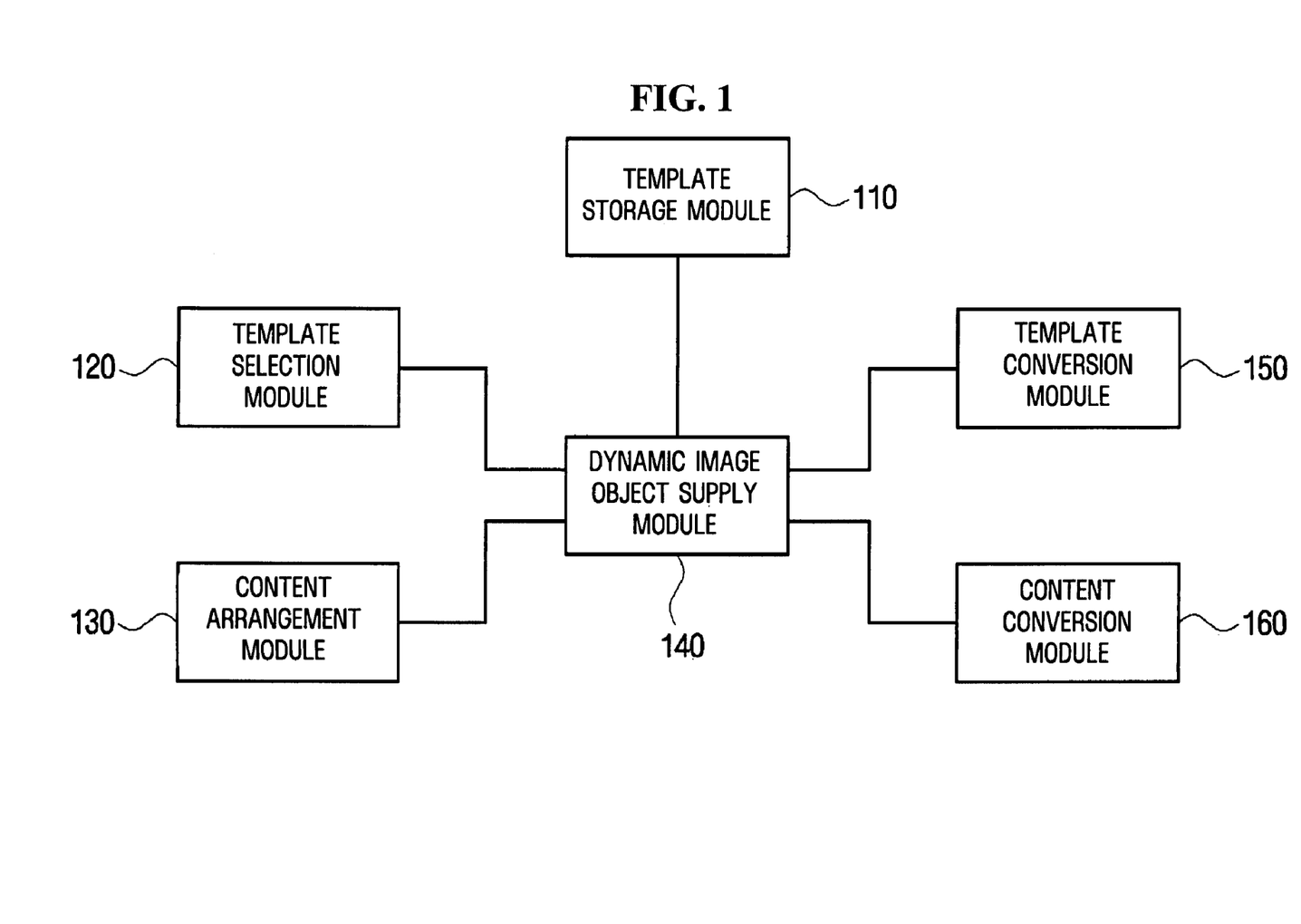
FIG. 1 illustrates a system to automatically create a dynamic image object, according to an embodiment of the present invention.

FIG. 1 illustrates a system to automatically create a dynamic image object, according to an embodiment of the present invention.

As shown in FIG. 1, the system may include a template storage module 110, a template selection module 120, a content-arrangement module 130, a dynamic image object supply module 140, a template conversion module 150, and a content conversion module 160, for example.

Figure 2:
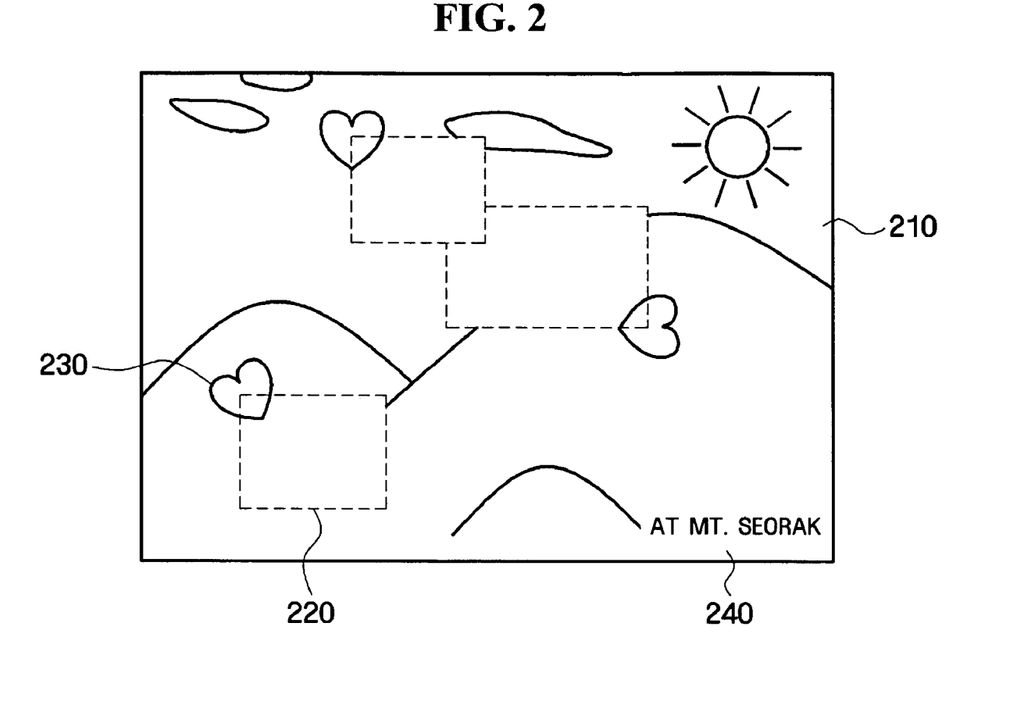
FIG. 2 illustrates a template according to first embodiment of the present invention.

Herein, the term "template" is used to refer to a frame in which content, such as pictures and dynamic image objects, is arranged. The template is used for an image unit group, which is a unit for the structure of the dynamic image object. Particularly, as shown in FIG. 2, the template may include a background image 210, a layout 220 wherein content may be arranged, a sticker 230 for decorating the background image 210, and a caption 240, noting that alternatives are equally available. It should be understood that the template includes various elements capable of decorating the content and/or assigning additional effects to the content, such as a background music for supplying sound effects while the content is displayed, an intro-image for informing the user that particular content will be or is being displayed, an ending-image for informing the user that the display of the particular content is or will be ending, a transition image in which the content and effects relating to the content are represented or disappear, animations for changing a position and a magnitude of the content in various velocities depending on time, a camera-work effect in which a camera, instead of the content, appears to move, a timer showing time information with respect to the content, a controller for allowing a user to perform various controls, and a feedback portion for allowing the user to provide comments on a plurality of content groups or each content, for example. Further, it is possible to supply a plurality of items for each element so that the user can select each structural element when choosing the template. In addition, the words of the templates and the plurality of elements included in the template should be taken solely as examples for understanding the present invention, alternate embodiments are equally available depending on the use thereof, as necessary.

The template storage module 110 can store a plurality of templates including a plurality of elements as described above. In some embodiments of the present invention, the templates stored in the template storage module 110 are described as examples in which a markup language is used.

Such a markup language includes the Hyper-Text Markup Language (HTML) and the extensible Markup Language (XML), but is not limited to these languages. The dynamic image object according to the embodiments of the present invention also can be made in the form of the markup language, like the above-mentioned templates.

The template selection module 120 can select a template, which corresponds to desired content groups including at least one set of content, from the template storage module 110. At this time, the content groups can be classified according to the relevancy of the content, the characteristics of effect for expressing the content, and user preferences.

For example, pictures taken at the same place may have a higher relevancy than that of pictures each of which is taken at different places. Pictures taken at the same relative time may have a higher relevancy than that of pictures each of which is taken at different times. Further, the content using identical elements among the plural elements included in the above-mentioned template, for example, identical background music or identical layout, can have a high relevancy. Therefore, it may be understood that the content group is a group of content having a relatively high relevancy as described above.

The template selection module 120 may select a template corresponding to the content group, depending on at least one selection condition among a plurality of selection conditions including the number of the content, a subject of the content, color of the content, time of obtainment of the content, place of obtainment of the content, the frequency of use of the template, and users' preference. At this time, the template selection module 120 can obtain a calculation value by which each selection condition is quantified, and select a template using a score which is obtained depending on a calculated value for each selection condition and a weight assigned to each of the selection conditions. The score can be obtained by the below Equation 1.

$$S=\Sigma W(i)*S(i).\qquad \text{Equation 1}$$

Here, S(i) is a calculated value which is obtained by quantifying each selection condition, and W(i) is a weight assigned to each selection condition. Further, S is a total sum of production of the calculated value obtained by quantifying each selection condition and the weight. The template selection module 120 selects the template having the greatest score, i.e., the total sum of the production of the calculated value and the weight. Further, the template selection module may select one structural element from the structural elements of the template in consideration of at least one of the user preferences and a fitness for the content.

The content-arrangement module 130 arranges the content of a content group corresponding to the template selected by the template selection module 120. At this time, the template conversion module 150 may not separately convert the selected template when the selected template is suitable for the corresponding content group, while converting the template when there is an element that is not suitable for the corresponding content group in elements of the selected template.

For example, if three contents can be arranged in the selected template, and only four content can be included in the content group, the template conversion module 150 may convert the layout of the selected so as to reduce the size of the layout in which each content is arranged, so that all the four contents can be arranged in the layout. Further, the template conversion module 150 may convert the positions of stickers and captions as the number of the content to be arranged in the selected template is changed. In addition, the template conversion module 150 may further suitably convert the plurality of elements included in the template, for example.

At this time, the template conversion module 150 may maintain the symmetry of the content and avoid arranging of the content on a line in order to get rid of monotony. The layout in which the content is arranged can be obtained by the below Equations 2 and 3, for example. Of course, Equations 2 and 3 may are merely examples for understanding the present invention. Equations, including Equations 2 and 3, need not be used according to the various circumstances in which the content are arranged. In addition, Equations, including Equations 2 and 3, may be used to arrange the content depending on users' preference.

$$Hci=\alpha(Hs/(n+\beta))\qquad \text{Equation 2}$$

Here, Hci is the height of an $i^{th}$ content, Hs is the height of an entire image, and n is the number of contents in the present content group.

Further, in the case where the content is a picture, the width of the content can be obtained in proportion to the height of the content obtained by the above-mentioned Equation 2.

$$Lci=Ws(i/(n+\epsilon))-Wci/2,\; Tci=Hs(i+\rho)/(n+\sigma))-Hci/2\qquad \text{Equation 3}$$

Here, Lci is an x coordinate of an ith content, Ws is the width of an entire image, and Wci is the width of the ith content. Further, in Equation 3, Tci is a y coordinate of the ith content, Hs is the height of an entire image, Hci is the height of the ith content, which may be obtained by the above mentioned Equation 2, and n is number of contents in the present content group.

Further, in Equations 2 and 3, important elements which determine the constants such as $\alpha$, $\beta$, $\epsilon$, $\rho$, and $\sigma$, may include a distance between the center portions of the content, an overlap ratio of the content, a symmetric arrangement, and a non-linear arrangement, etc. Further, the arrangement angle of each of the content can be set in order to avoid the non-linear arrangement of the content.

When the content-arrangement module 130 arranges the content included in the content group within the template, e.g., selected by the template selection module 120 or the template converted by the template conversion module 150, the content conversion module 160 may convert attributes of the content including a color attribute of the content, an image conversion and a displayed region/interval according to context information including an atmosphere of the selected template, a color attribute, and timing background, so that the content can fit within the template. The dynamic image object supply module 140 may further synchronize the timing of the image unit group and the structural elements in which the content are arranged by the above mentioned content-arrangement module 150 with background music, for example, so as to display the dynamic image object. At this time, since each of the image unit group and the structural elements are synchronized with the example background music, etc., while the image is changed after a predetermined time, or animations are applied to the image, the user may recognize the static content as dynamic image objects.

Figure 3:
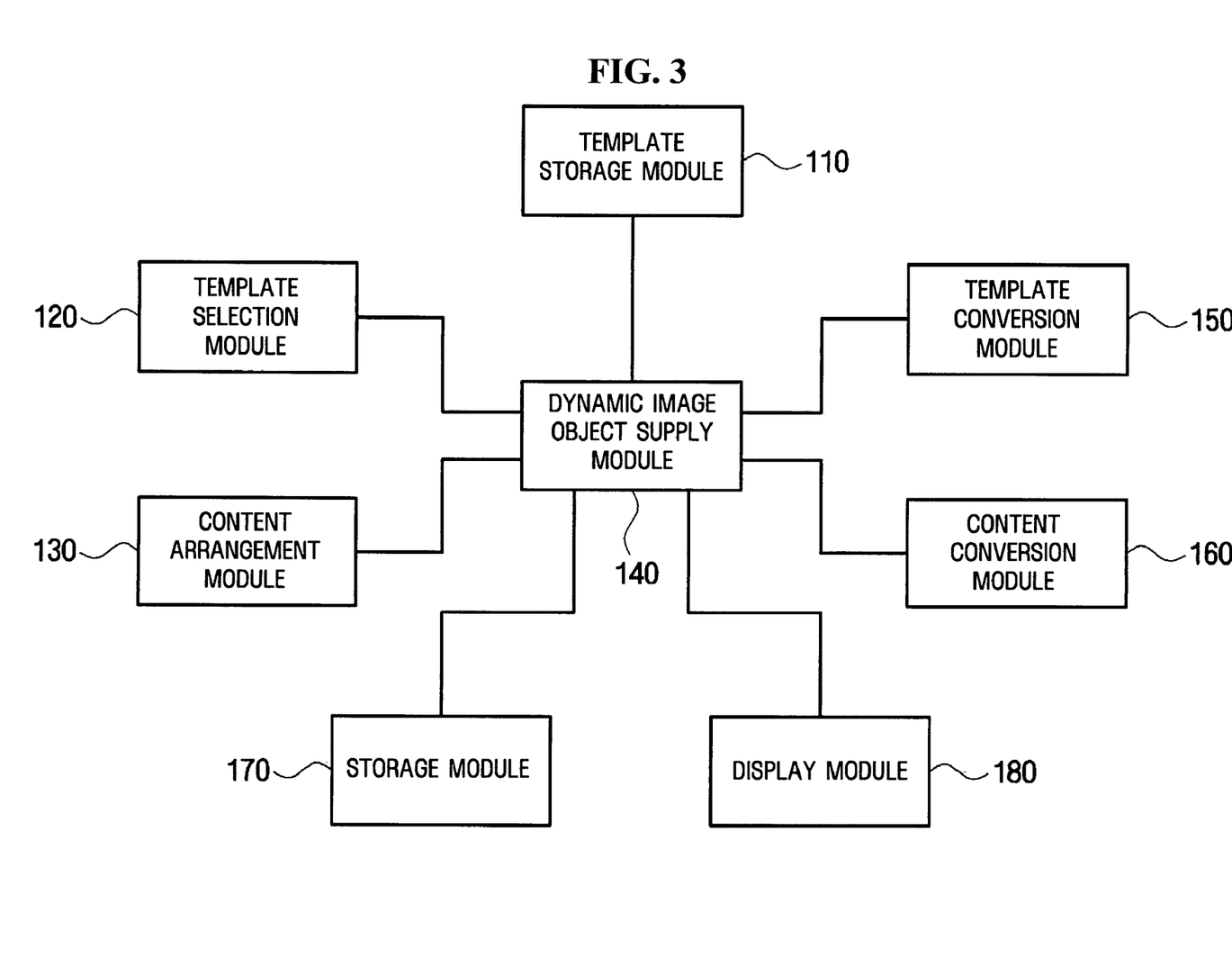
FIG. 3 illustrates a system to automatically create a dynamic image object, further according to an embodiment of the present invention.

FIG. 3 illustrates a system to automatically create dynamic image object, according to an embodiment of the present invention.

As shown in FIG. 3, the system 100 may also include a storage module 170 to store the dynamic image object in which content are arranged and a display module 180 to display the dynamic image object in which the content are arranged, in addition to the elements illustrated in FIG. 1. Here, the storage module 170 may store the dynamic image object in the form of a markup language, as like the template storage module 110. Thus, the dynamic image object supply module 140 may repeatedly supply the content through the dynamic image object stored in the storage module 170, and display the dynamic image object stored in the storage module 170 through the display module 180 according to a users' instructions. Further, since the display module 180 synchronizes the template, where the content are arranged, with background music, the user can appreciate the template having the content displayed as a dynamic image object.

Figure 4:
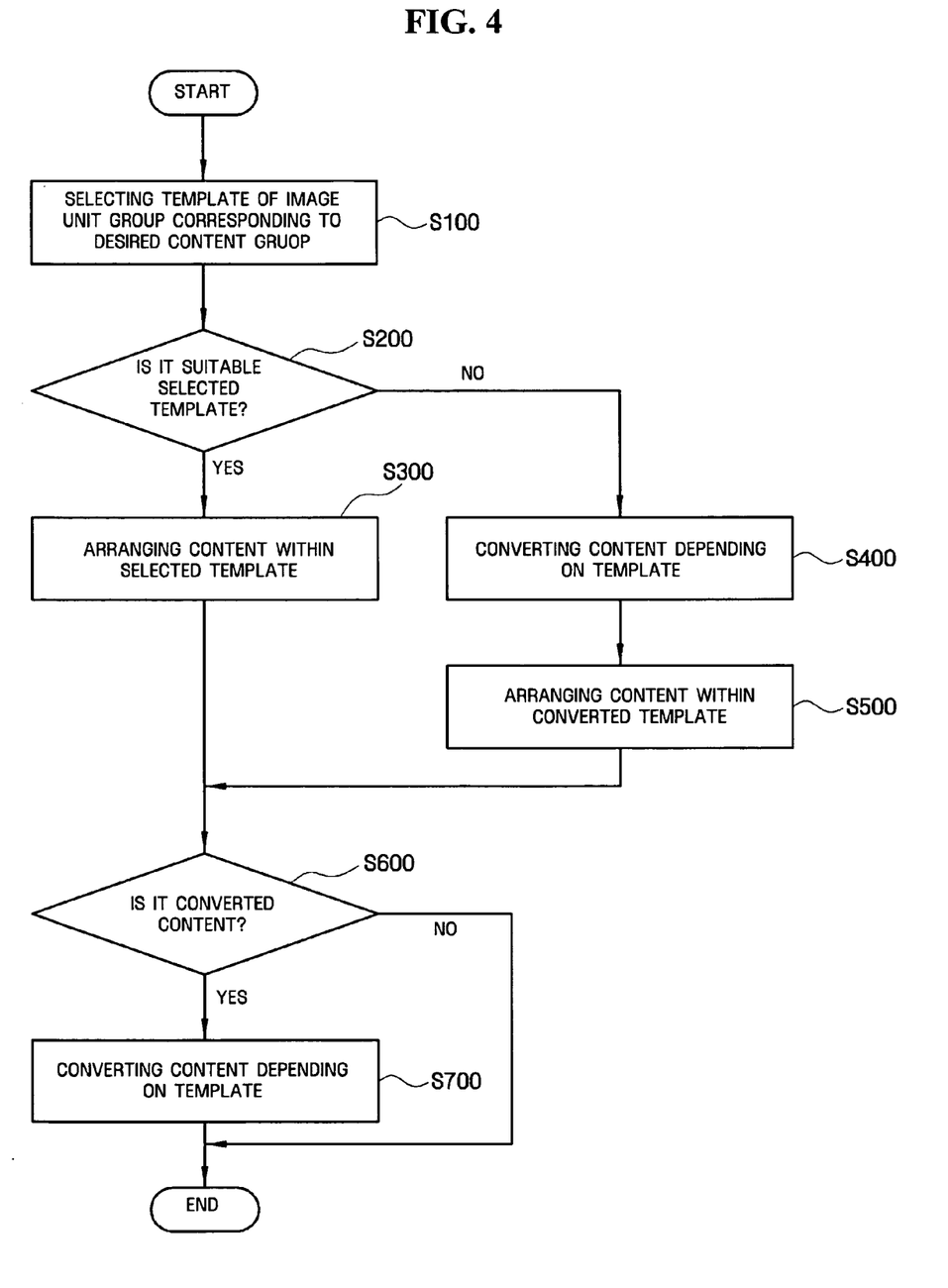
FIG. 4 illustrates a method of automatically creating a dynamic image object, according to an embodiment of the present invention.

FIG. 4 illustrates a method of automatically creating a dynamic image object, according to an embodiment of the present invention.

As shown in FIG. 4, first, the template corresponding to a desired content group may be selected, e.g., by the template selection module 120 from the template storage module 110, in operation S100. As an example, the template selection module 120 may select a suitable template from the template storage module 110 according to conditions for classification of the content groups, for example, based on the relevancy of the content, the effect for expressing the content, and the users' preference.

Whether the selected template is suitable for the corresponding content group may further be determined, e.g., by the content-arrangement module 130, in operation S200. For example, in the case where only three contents can be arranged in the selected template, when four contents are included in the content group, the content-arrangement module 130 may determine that the selected template is not suitable for the content group.

As the result of this determination, when the selected template is suitable for the content group, the content of the corresponding content group may be arranged within the selected template, e.g., by the content-arrangement module 130, in operation S300.

As another result of determination, when the selected template does not fit with the corresponding content group, the selected template may be converted to fit, e.g., by the template conversion module 150, in operation S400.

Figure 5:
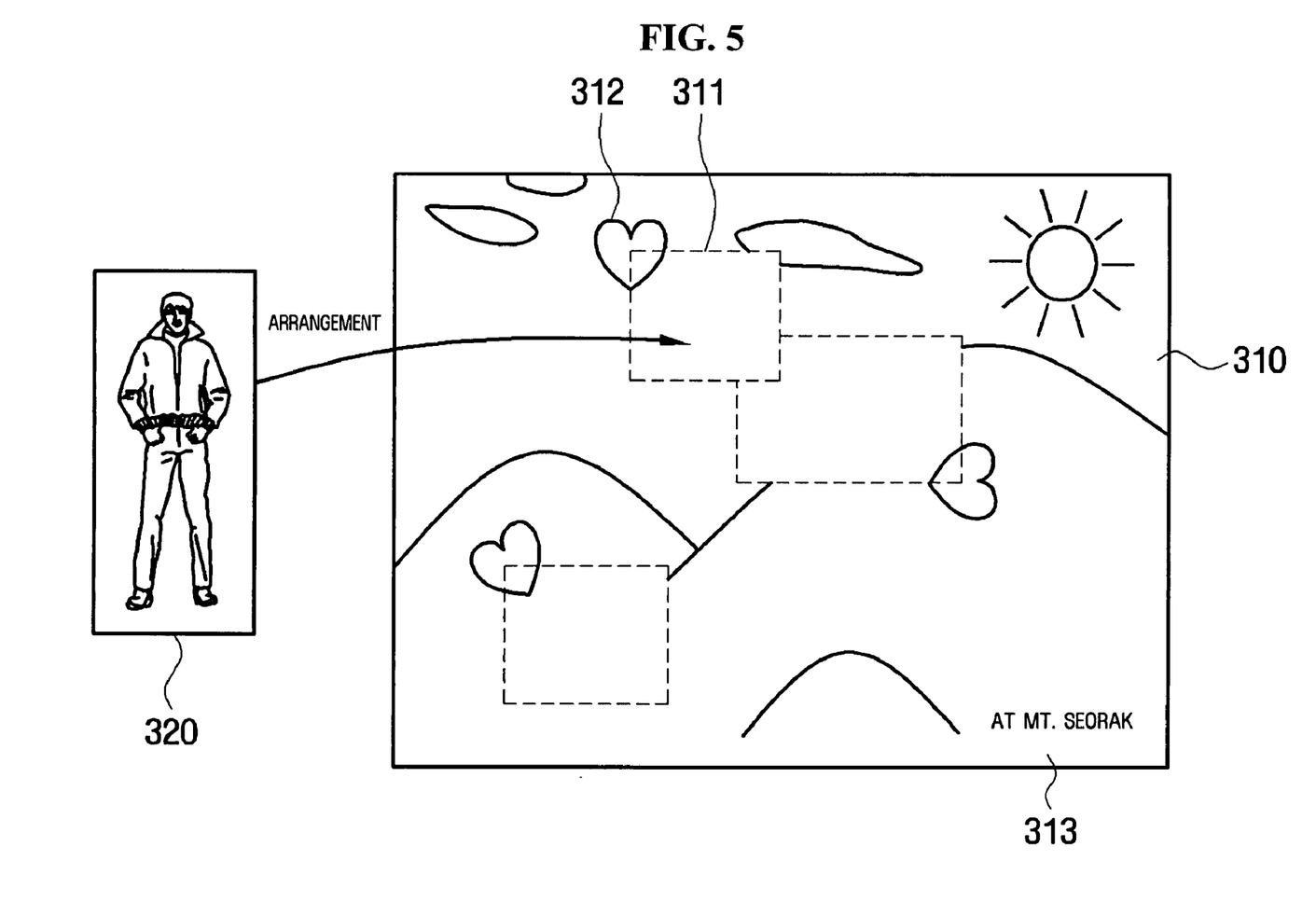
FIG. 5 illustrate a template having an element that is not suitable for content, according to an embodiment of the present invention.
Figure 6:
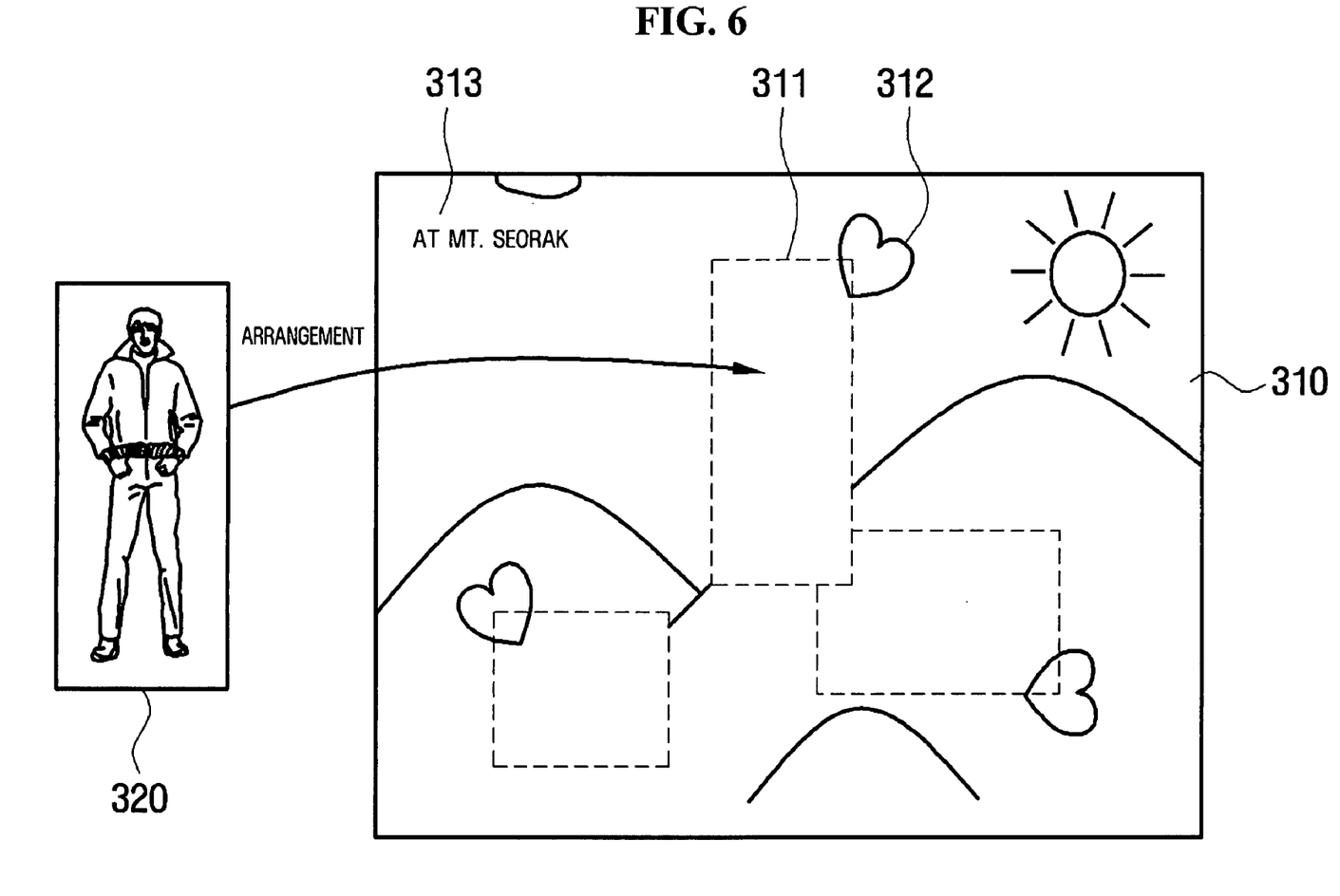
FIG. 6 illustrates a template converted to be suitable for content, such as that shown in FIG. 5, according to an embodiment of the present invention.

For example, as shown in FIG. 5, when the layout 311 within the selected template 310 is not suitable for arrangement of the content 320, the template conversion module 150 may convert layouts 311, stickers 312, and captions 313 of FIG. 5 to take into consideration the layout 311 of the template 310, where the content 320 is to be arranged, as shown in FIG. 6. After the completion of the conversion of the layout 311, the positions of the stickers 312 and the caption 313 shown in FIG. 5 have also been changed so that the content 320 can be suitably arranged.

In this embodiment of the present invention, this is only an exemplarily illustration of the template conversion module 150 converting the layout, the stickers and the caption. However, embodiments of the present invention are not limited thereto. In other words, as shown in FIG. 6, elements, such as a transition which is an effect that the caption 312 disappears as the layout 311 is converted, an animation in which a position and a magnitude of each element of the template is changed in various velocities, and camera work which is an effect that the camera appears to move without the change of the template, which is included in the various templates, can similarly be converted along with the template as the template is changed.

Then, the content included in the content group may be arranged within the converted template, e.g., by the content-arrangement module 130, in operation S500.

Further, whether the content, e.g., arranged within the template selected by the template selection module 120 or the template converted by the template conversion module 150, have been converted may be determined, e.g., by the content-arrangement module 130, in operation S600. Specifically, the content conversion module 150 may convert attributes of the content including a color attribute of the content, an image conversion and a displayed region/interval according to context information including an atmosphere of the selected template, color attribute, and timing background. For example, in order to emphasize the content, the content may be converted so as to have a complementary color with respect to the color of the template or a restful color suitable for the background image. In addition, the content can be converted from a color image into a black and white image, or lightening effects can be applied to the content.

In the case where the contents are converted, separate effects may be supplied to the content arranged within the template, as described above, e.g., by the content conversion module 160, in operation S700.

As described above, the system, medium, and method to automatically create a dynamic image object, according to an embodiment of the present invention, may automatically create the dynamic image object from the static content, based on the template, and assign various effects to the dynamic content, thereby providing the specified and fresh images to the user and enabling the user to instinctively and easily identify the relevancy of the content.

The word "module", herein, may, as only an example, refer to computer readable code, a structural hardware element such as a Field Programmable Gate Array (FPGA), an Application Specific Integrated Circuit (ASIC), which carries out a certain process, or a mixture of the same. As another example, the module may be arranged within an addressable storage medium, or constructed to implement control of one or more processors. Accordingly, as a further example, the module may include structural elements such as software structure elements, object-oriented software structure elements, class structure elements and task structure elements, processes, software functions, attributes, procedures, subroutines, segments of program code, drivers, firmware, microcode, circuits, data, databases, data structures, tables, arrays, and parameters, etc. The processes provided by the structural elements and the modules may be combined with the small number of the structural elements and the modules, or provided to additional structural elements and the modules.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), and optical recording media (e.g., CD-ROMs, or DVDs). Here, the medium may further be a signal, such as a resultant signal or bitstream, according to embodiments of the present invention. The media may also be a distributed network, so that the computer readable code is stored/transferred and executed in a distributed fashion. Still further, as only a example, the processing element could include a processor, a computer processor, or a programmable data processing device, and processing elements may be distributed and/or included in a single device.

For example, embodiments of the present invention may have been described with reference to block diagrams and flowcharts in the accompanying drawings. Here, it should be understood that each block of the flowcharts and combinations of the flowcharts may be implemented by such computer readable code, e.g., computer program instructions, that can be provided in or for a processor of a general-purpose computer, a special-purpose computer or other programmable data processing apparatus. Instructions executed by the processor of the computer or other programmable data processing device, implement processes specified in the flow diagram blocks. Thus, the computer-usable or computer-readable memory having the computer readable code can similarly produce an article of manufacture, including instruction elements that can control the implementation of processes specified in the blocks of the flowcharts.

As described herein, each block in the flowcharts may represent a part of a module, a segment, or code, which includes one or more executable instructions to implement the specified logical processes. It should also be noted that in some alternative implementations, the processes noted in the blocks may occur in a different order. For example, two blocks shown in succession may in fact be executed substantially and concurrently or the blocks may be executed in reverse order, depending on the processing involved.

These descriptions of implementing the computer readable code and media are only meant to be examples and should not be considered limiting of the present invention.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system to automatically create a dynamic image object, comprising:
   a template selection module to select a template of an image unit group corresponding to a desired content group that includes contents with relevancy;
   a content-arrangement module to arrange at least one selected content of the content group in the selected template; and
   a dynamic image object supply module to supply a dynamic image object in which the content is arranged.

2. The system of claim 1, wherein the template selection module selects the template corresponding to the content group based on at least one selection condition among a plurality of selection conditions including a number of contents, a respective content subject, a respective content color, a respective content time of obtainment, a respective content place of obtainment, a respective template frequency of use, and user preferences.

3. The system of claim 2, wherein the template selection module selects a template having a greatest score based on a calculated value for each of the selection conditions and a weight assigned to each of the selection conditions.

4. The system of claim 3, wherein a score S is obtained based on: $S=\Sigma(W(i)*S(i))$, where $S(i)$ is a calculated value for each selection condition, and $W(i)$ is a weight assigned to each selection condition.

5. The system of claim 2, wherein the template selection module selects one structural element from structural elements of the template in consideration of at least one of the user preferences and a quality of appeal with respect to the content.

6. The system of claim 1, further comprising:
   a template conversion module to convert the selected template according to the content; and
   a content conversion module to convert the content according to the selected template.

7. The system of claim 6, wherein the template conversion module converts the selected template when a number of contents included in the content group is greater than a number of contents to be arranged in the selected template.

8. The system of claim 7, wherein the content-arrangement module arranges the content in the converted template.

9. The system of claim 6, wherein the content conversion module converts attributes of the content including a color attribute of the content, an image conversion and a displayed region/interval according to context information including an atmosphere of the selected template, a color attribute, and a timed background.

10. The system of claim 1, wherein the template and the dynamic image object are expressed in a markup language.

11. The system of claim 1, further comprising:
    a storage module to store the dynamic image object in which the content is arranged; and
    a display module to display the dynamic image object in which the content is arranged.

12. The system of claim 11, wherein the display module synchronizes the dynamic image object with background music, so as to display the dynamic image object.

13. A method of automatically creating a dynamic image object, comprising:
    selecting a template of an image unit group corresponding to a desired content group including contents with relevancy;
    arranging, using at least one processing device, at least one selected content of the content group in the selected template; and
    supplying a dynamic image object in which the content is arranged.

14. The method of claim 13, wherein the template selection includes selecting the template corresponding to the content group based on at least one selection condition among a plurality of selection conditions including a number of the contents, a respective content subject, a respective content color, a respective content time of obtainment, a respective content place of obtainment, a respective template frequency of use, and user preferences.

15. The method of claim 14, wherein the template selection includes selecting a template having a greatest score based on a calculated value for each of the selection conditions and a weight assigned to each of the selection conditions.

16. The method of claim 15, wherein a score S is obtained based on: $S=\Sigma(W(i)*S(i))$, where $S(i)$ is a calculated value for each selection condition, and $W(i)$ is a weight assigned to each selection condition.

17. The method of claim 14, wherein the template selection includes selecting one structural element from structural elements of the template in consideration of at least one of the user preferences and a quality of appeal with respect to the content.

18. The method of claim 13, further comprising:
    converting the selected template according to the content; and
    converting the content according to the selected template.

19. The method of claim 18, wherein the template conversion includes converting the selected template when a number of the contents included in the content group is greater than a number of contents to be arranged in the selected template.

20. The method of claim 19, wherein in the content arrangement, the content is arranged in the converted template.

* * * * *

UNITED STATES PATENT AND TRADEMARK OFFICE
CERTIFICATE OF CORRECTION

PATENT NO. : 7,825,934 B2
APPLICATION NO. : 11/583776
DATED : November 2, 2010
INVENTOR(S) : Hye-Jeong Lee et al.

It is certified that error appears in the above-identified patent and that said Letters Patent is hereby corrected as shown below:

Column 10, Line 4 in Claim 4, delete " $S = \Sigma(W(i) * S(i))$. " and insert -- $S = \Sigma W(i) * S(i)$. --, therefor.

Column 10, Line 63 in Claim 16, delete " $S = \Sigma(W(i) * S(i))$. " and insert -- $S = \Sigma W(i) * S(i)$. --, therefor.

Signed and Sealed this
Eighth Day of March, 2011

David J. Kappos
*Director of the United States Patent and Trademark Office*